Figure 3:
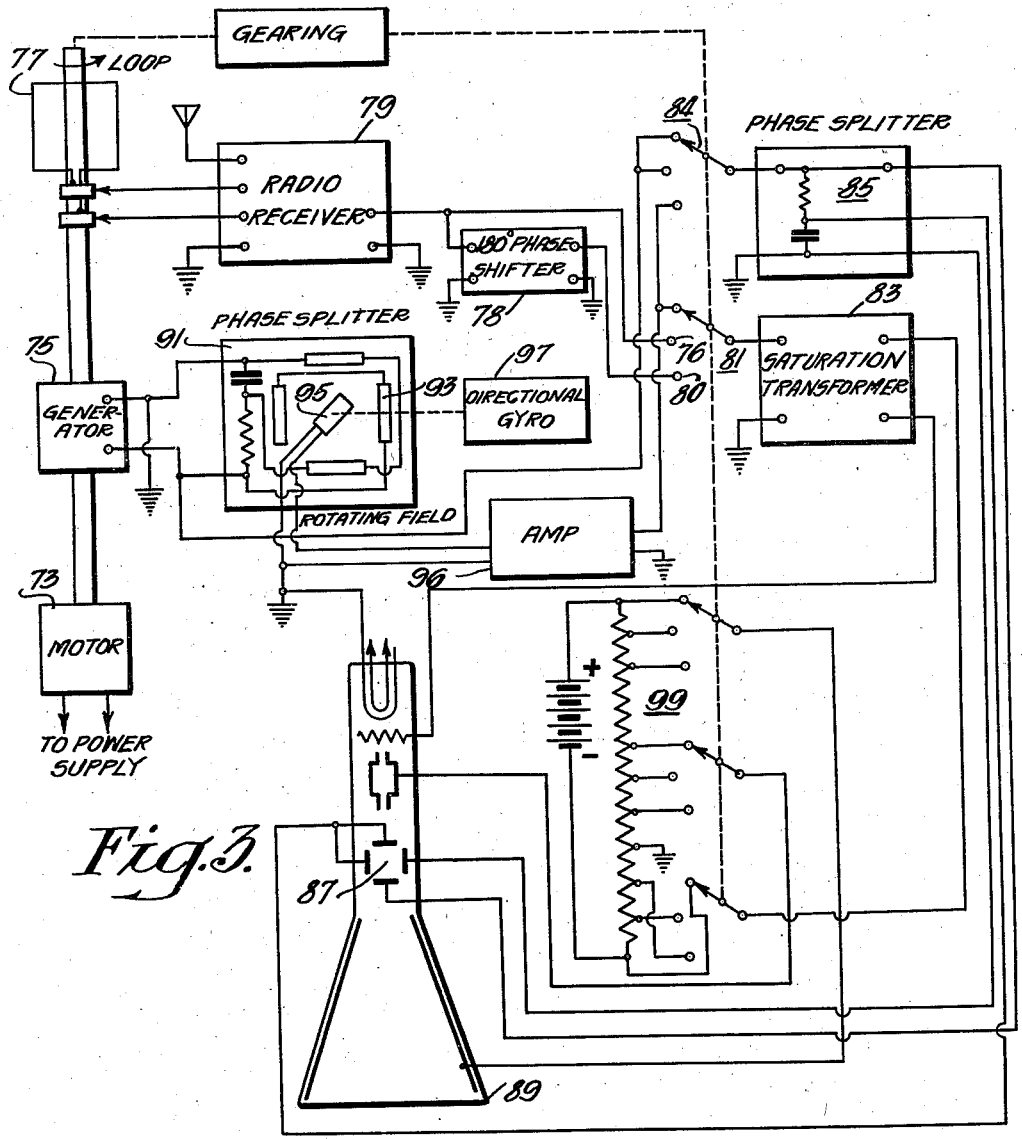

Feb. 25, 1941.  I. WOLFF  2,233,275
NAVIGATIONAL INSTRUMENT
Filed Jan. 31, 1939   2 Sheets-Sheet 1
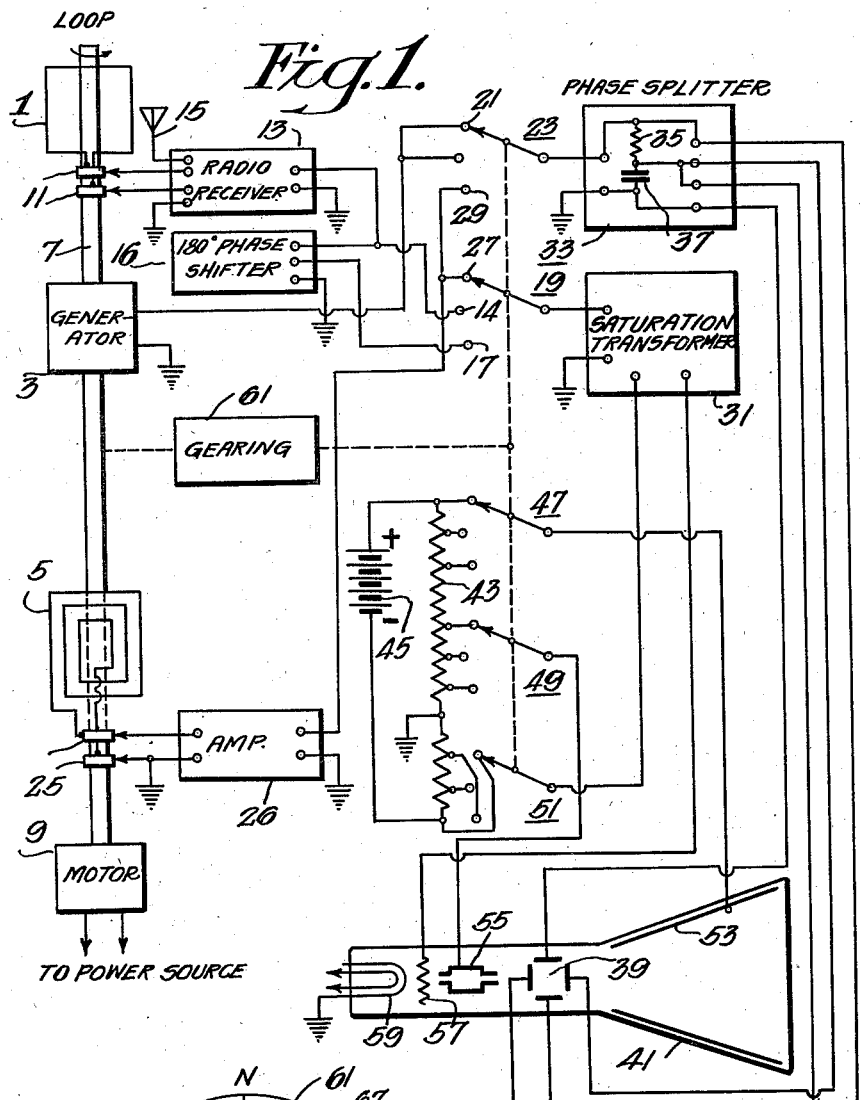
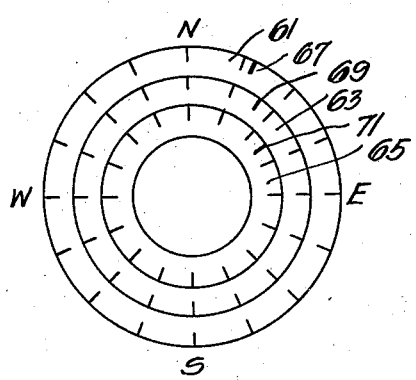
Inventor
Irving Wolff
By
Attorney Patented Feb. 25, 1941

2,233,275

UNITED STATES PATENT OFFICE 2,233,275

NAVIGATIONAL INSTRUMENT

Irving Wolff, Merchantville, N. J., assignor to Radio Corporation of America, a corporation of Delaware Application January 31, 1939, Serial No. 253,851

9 Claims. (Cl. 250—11)

This invention relates to improvements in navigational devices and especially to an instrument for indicating the heading of a craft with respect to a line on the earth's surface usually magnetic north, the heading of the craft with respect to a line between it and a radio station, and the bearing of the craft with respect to the radio station. The several indications are arranged on a single dial.

The navigator of an aircraft may require information of the heading of the craft with respect to north. This is usually obtained from an earth compass of the earth inductor or magnetic type, or a directional gyro. Information is also employed which is obtained from a radio compass. In general, such radio compasses indicate the direction of a radio transmitter with respect to the longitudinal axis of the aircraft, or the direction of the craft with respect to the transmitter. It is generally necessary to convert this information into bearings determined by reference to north by adding algebraically the earth heading and the radio compass heading.

If the aircraft is moving at high velocity, the time required to make calculations or conversions may correspond to a movement of the order of 3 to 4 miles per minute. It is, therefore, desirable to supply the information not only as directly and quickly as possible, but to also collect the information on a single instrument whereby the operator of the craft may avoid the inconvenience of observing a plurality of different instruments.

An object of the instant invention is to provide means for indicating earth compass, radio compass, and radio bearings on a single dial. Another object is to provide means for the navigation of aircraft and other mobile vehicles in which navigational data is quickly indicated on a single device. An additional object is to provide means for algebraically combining radio compass and earth compass headings whereby a radio bearing is indicated.

The invention will be described by reference to the accompanying drawings in which Figure 1 is a schematic circuit diagram of one embodiment of the invention, Figure 2 is a view of the indicator employed in the invention, and Figure 3 is a modification of the embodiment illustrated in Fig. 1.

Referring to Fig. 1, a loop antenna 1, a generator 3 and an earth inductor 5 are mounted in a predetermined phasal relation on a common shaft 7 which is rotated by a suitable motor 9. The terminals of the loop 1 are connected through slip rings 11 or the like to a radio receiver 13. A nondirectional antenna 15 may also be coupled to the receiver whereby the directional response of the receiver assumes the characteristic of a cardioid.

The output of the radio receiver is connected directly to the center terminal 14 and through a phase shifter 16 to the lower terminal 17 of a three-position switch 19. The output from the generator is connected to the upper terminals 21 of a three-position switch 23. The output from the earth inductor is connected through slip rings 25 or the like and an amplifier 26 to the upper terminal 27 of the first-mentioned switch 19 and the lower terminal 29 of the second-mentioned switch 23.

The movable contact of the first-mentioned switch 19 is connected to a saturation transformer 31. The movable terminal of the second-mentioned switch 23 is connected to a phase splitting circuit 33 which may consist of a serially connected resistor 35 and capacitor 37. The output from the phase splitter is impressed upon the deflecting elements 39 of a cathode ray tube 41.

The cathode ray tube is biased by connections to a potentiometer 43 which is connected to a battery 45 or other suitable power source. The potentiometer connections are made by three three-position switches 47, 49, 51. The movable terminals of these switches are connected respectively to the second anode 53, first anode 55 and through the saturation transformer 31 to the control grid 57. The cathode 59 is returned to the potentiometer through ground as shown. The several three-position switches 19, 23, 47, 49, 51 are preferably operated in synchronism and may be driven by a connection to the rotating shaft 7. Such connection should include gearing 61 so that the switch operates at a slower rate than the shaft. The switching rate is preferably of the order of the persistence of vision.

The operation of the device is essentially as follows: The loop rotating in the radio field will establish in the output of the radio receiver an alternating current having a phase dependent upon the relative position of the loop and radio wave front. The generator 3 is designed to create an alternating current of the frequency of the loop currents whereby a fixed reference phase is established. The earth inductor rotating in the earth's magnetic field generates an alternating current whose phase is dependent upon the orientation of the inductor with respect to the earth's field.

There are thus available three alternating currents. The first of the three alternating currents represents a reference phase, the second phase depends upon the earth heading or the angular relation between the longitudinal axis of the craft carrying the device and a reference line on the earth, and the third phase upon the radio compass heading or the angular relation between the axis of the craft carrying the device and a radio wave front. The three phases have been determined by adjusting the loop inductor coil and generator with respect to the rotating shaft so that there is zero phase difference between the first and second currents when the craft is heading north and the phase difference of the first and third currents is zero when the craft is heading toward the radio transmitter. These three alternating currents are successively applied through the switches 19 and 23 so that connections of contacts 21 and 27 indicate the earth inductor phase or earth heading, the center contacts indicate the radio compass phase or radio compass heading, and the third contacts 29, 27 compare the radio compass phase with the earth inductor phase to indicate the radio bearing in terms of the earth's field or a meridian.

The function of the 180° phase shifter, which is connected between the radio receiver output and the lower terminal 17 of switch 19, is to give the radio bearing of the receiver with respect to the transmitter rather than the converse. Since this is a matter of preference, the 180° phase shifter may be omitted to indicate the transmitter bearing with respect to the receiver.

The currents applied to switch 23 are initially single phase currents. This phase is split into two phases and the two phase currents are applied to the deflecting elements 39 of the cathode ray tube whereby the cathode ray is rotated in synchronism with the shaft 7. To indicate the several relative phases separately and distinctly, the bias voltages applied to the grid and two anodes are varied in synchronism with the applications of the different phases so that the cathode ray indication of the phase displacement operates on scales 61, 63, 65 of different radii as shown in Fig. 2. The marks indicating the phase displacement are shown as the heavy lines 67, 69, 71, respectively. The potentials required to indicate such phase displacement may be applied to the control grid 57. The reason for biasing the several electrodes simultaneously is to maintain the cathode ray trace in focus and at usable intensity on the fluorescent screen.

In some installations the earth compass of the inductor type may be considered objectionable. A directional gyro may be substituted for the inductor compass, as illustrated in Fig. 3. In this arrangement, a motor 73 is connected to a generator 75 and a loop 77 whereby the generator and the loop may be rotated in synchronism. The loop is connected to a radio receiver 79. The output circuit of the radio receiver is connected directly to the center terminal 76 and through the 180° phase shifter 78 to the lower terminal 80 of a three-position switch 81 to a saturation transformer 83. The output from the generator 75 is impressed through the upper terminals of a three-position switch 84 on a phase-splitting circuit 85. The phase-splitting circuit 85 is connected to the deflecting elements 87 of a cathode ray tube 89.

The generator 75 is connected to a second phase-splitting circuit 91, the output of which is applied to two pairs of coils 93 which are arranged and connected to produce a rotating field. A small coil 95, preferably feeding into a circuit of high impedance, is connected to the indicating card of the gyro compass 97. Thus arranged, the coil 95 assumes a position in the rotating field corresponding to the directional gyro bearing without reacting on the gyro. The terminals of the small coil 95 are connected respectively to ground and through an amplifier 96 to the upper and lower fixed terminals of the three-position switches 81, 84.

In this arrangement, the cathode ray tube is connected to biasing means 99 and to the saturation transformer 83 as explained above. The operation of the embodiment of the invention illustrated in Fig. 3 is essentially the same as the operation of the circuit of Fig. 1. The phase of the radio receiver output currents is compared to the reference phase currents of the generator 75 to provide the radio heading indication. The phase of the currents from the generator are compared to the phase of the currents induced in the small coil to indicate the gyro compass reading or earth heading; and, finally, the phase of the currents induced in the small coil indicating the gyro compass heading are compared to the phase of the radio receiver output currents to indicate the radio bearing in terms of a meridian.

Thus, the invention has been described as a navigational instrument in which earth heading, radio compass heading, and radio bearing information is applied to a single dial. The information thus obtained is especially conveniently arranged for navigating rapidly moving vehicles, such as aircraft. While the invention has been described by reference to rotating elements, it should be understood that moving parts may be eliminated by the substitution of suitable electrical circuit arrangements. For example, the alternating current whose phase depends upon the radio wave front may be generated as disclosed in the copending application of Sev, Serial No. 115,899, filed December 15, 1936, and entitled "Direct reading goniometer."

In such case, the reference phase becomes that of the modulator which eliminates the rotatable generators and the motor drive. In this connection, the switching device may be driven by any suitable motor, or electronic switching may be substituted. The method of applying energy through the saturation transformer to the cathode ray tube has been disclosed in U. S. Patent 2,092,281, issued September 7, 1937, to Miles A. McLennan and entitled "Indicator."

It should also be understood that a position indication may be obtained by applying the signals from two transmitters to a double cathode ray tube whereby the radio bearings establish intersecting cathode ray traces which indicate position.

I claim as my invention:

1. In a navigational device, means for deriving a current having a phase dependent upon the relation between the longitudinal axis of the craft carrying the device and the wave fronts in a radio field, means for deriving a second current having a phase dependent upon the relation between the longitudinal axis of the craft carrying the device and a reference line on the surface of the earth, means for generating a third current having a reference phase, and a single means for indicating the phase differences of said three currents.

2. In a navigational device, means for deriving an alternating current having a phase dependent upon the angular relation between the longitudinal axis of the craft carrying the device and the front of waves in a radio field, means for deriving a second alternating current having a phase dependent upon the heading of the craft carrying the device with respect to a reference line on the surface of the earth, means for generating a third alternating current having a reference phase, and a single means for indicating the phase differences of said three alternating currents.

3. In a navigational device, means for generating a current having a phase dependent upon the position of the device with respect to a radio wave front, means for generating a second current having a phase dependent upon the angle between the longitudinal axis of the craft carrying the device and a reference line on the earth, means for generating a current including a reference phase, and a single means for comparing said first and second, second and third, and first and third mentioned phases.

4. A device of the character of claim 3 further characterized by the fact that the last-mentioned means is a cathode ray tube including means for differently biasing said tube to indicate said phase comparisons separately.

5. A navigational instrument including a radio compass, means for deriving from said radio compass a current having a phase determined by the angle between the axis of a craft carrying the device and a radio wave front, a compass for indicating the heading of the craft with respect to a reference line on the earth, means for generating a varying current, means coupling said last-mentioned compass and said generating means for deriving a varying current of a phase dependent upon said heading, and a single means for indicating said heading of said craft in terms of phase angle and said radio bearings as a function of the difference in phase of the radio compass current and said last-mentioned varying current.

6. In a device of the character of claim 5, a cathode ray tube for indicating said radio bearings, and means for applying different biases to said tube so that said craft heading as a function of the wave front and said craft heading with respect to said reference line may be indicated on different scales on said tube.

7. A navigational instrument including, in combination, a radio compass, a directional gyro, means for deriving from said radio compass an alternating current having a phase dependent upon the orientation of said radio compass, means for creating a rotating field, an element positioned within said field and movable as a function of said directional gyro heading, means for deriving from said element an alternating current having a phase dependent upon said gyro heading, and means for observing the differences in said phases to indicate a radio bearing in terms of the gyro heading.

8. A device of the character of claim 7 in which the means for indicating said difference in phase is a cathode ray tube having a plurality of separate scales for indicating bearings and headings, and means for biasing said tube so that said directional gyro heading is indicated on a separate scale on said tube.

9. The method of indicating navigational data on a single instrument which includes generating a current having a phase dependent upon the earth's field, generating a current having a phase dependent upon the wave fronts in a radio field, generating a current having an independent phase, and indicating the differences of said phases at a rate of the order of the persistence of vision on said single instrument.

IRVING WOLFF.